Figure 1:
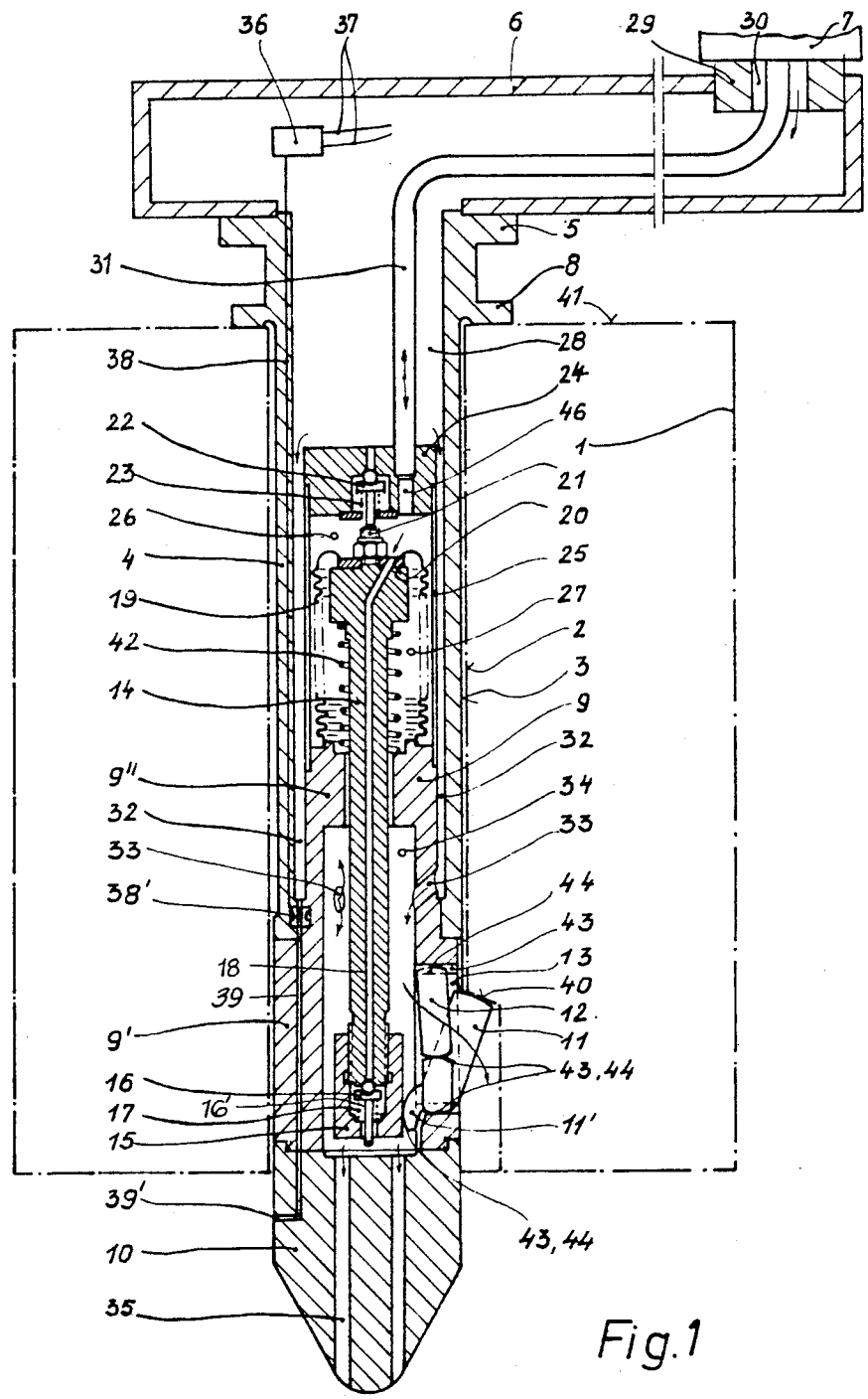

United States Patent [19]
Rösgen et al.

[11] 3,801,148
[45] Apr. 2, 1974

[54] GRABBING DEVICE FOR A NUCLEAR CHARGING MACHINE

[75] Inventors: Friedhelm Rösgen, Forsbach, Germany; Hans Schwarz, Umiken, Switzerland

[73] Assignee: Aktiengesellschaft Brown, Boveri & Cie, Baden, Switzerland

[22] Filed: Sept. 14, 1971

[21] Appl. No.: 180,416

[30] Foreign Application Priority Data
Sept. 30, 1970 Switzerland.................... 14566/70

[52] U.S. Cl.......... 294/86 A, 294/86.15, 294/86.24, 294/93
[51] Int. Cl. ............................................. B66c 1/54
[58] Field of Search.... 294/86 R, 86 A, 86.1, 86.15, 294/86.13, 86.14, 86.21, 86.24, 93, 95, 97, 88; 176/12, 31

[56] References Cited
UNITED STATES PATENTS
3,199,911  8/1965  Alliot et al............................ 294/95
2,984,302  5/1961  Church....................... 294/81.15 X FOREIGN PATENTS OR APPLICATIONS
1,512,350  5/1966  France............................. 294/86.24
797,881    3/1955  Great Britain......................... 294/88

Primary Examiner—Evon C. Blunk
Assistant Examiner—Johnny D. Cherry
Attorney, Agent, or Firm—Pierce, Scheffler & Parker

[57] ABSTRACT

A grabbing device for manipulating a fuel element of a nuclear reactor comprises a carrier tube adapted to be inserted into a hole extending longitudinally within the fuel element and which is provided with an extraction recess. Cooling gas is caused to flow through the carrier tube, which latter contains a gas pressure actuated longitudinally moveable plunger having latch means adapted to engage the extraction recess provided in the fuel element.

3 Claims, 4 Drawing Figures

GRABBING DEVICE FOR A NUCLEAR CHARGING MACHINE

The invention concerns a grabbing device of a charging machine for the fuel elements of a gas-cooled nuclear reactor where each fuel element has passing through it at least one hole provided with extraction recesses such that a carrier tube can be introduced into the hole and the carrier tube contains a latching device engageable with the extraction recesses provided in the fuel element.

It is required of the grab of a charging machine that it should operated with great reliability at high ambient temperature and in a gas atmosphere, for example 900° C and helium, such as found in modern gas-cooled nuclear reactors.

Grabbing devices are known which are inserted in holes centrally located in fuel element blocks and which, by means of mechanical or partly pneumatic devices, can grip and manipulate the fuel element. The known types of construction have the disadvantage that sliding friction of the grab components creates a risk of seizure or frictional wear because the oxide film normally formed on the component surfaces is lacking.

The characteristic nature of frictional wear between metals in contact in a gas atmosphere, e. g. including methane, neon, etc., is greatly intensified by high ambient temperatures so that there is no longer any assurance that the grabbing device will function reliably while the reactor is in operation.

The purpose of the present invention is to ensure continuing reliability of the grabbing device and largely to eliminate sliding friction between its moving parts.

In accordance with the invention this purpose is achieved in that cooling gas flows through the carrier tube and that inside the carrier tube there is a plunger, able to move longitudinally, which engages latching catches in the extraction recesses of the fuel element by means of rolling guides.

In a preferred version of the invention the plunger, supported on a sleeve by way of a bellows, controls two automatic valves, and control pressure is supplied to the plunger cylinder by way of flexible pipes.

In a further advantageous form of the invention the rolling guides consist of flexible bands.

The advantages of the invention lie in the simple construction of the grabbing device, since rolling friction is reduced to a minimum and the cooling gas flowing through the grabbing device lowers the ambient temperature to a value which does not impair the functional reliability.

An additional advantage of the grabbing device according to the invention is that the position of the grab in the reactor core can be continuously monitored, and also that the components are so arranged as to require practically no maintenance.

Figure 2:
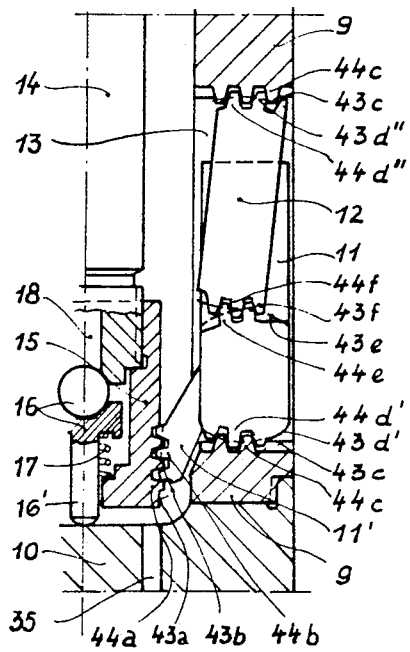
Figure 3:
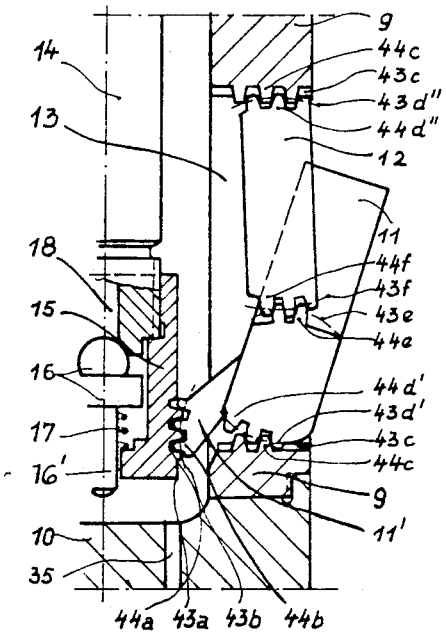
Figure 4:
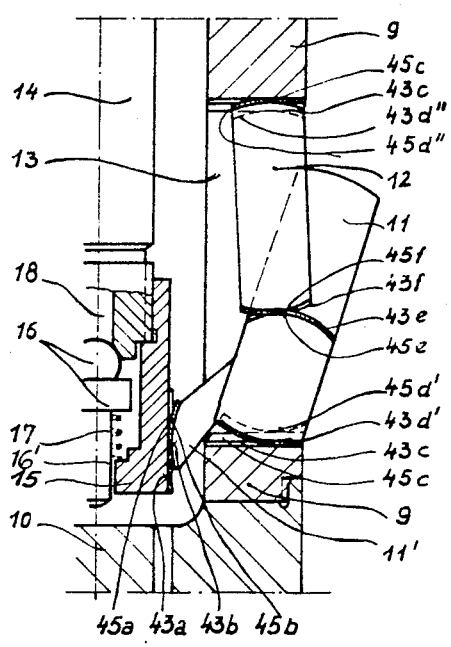

The invention is described in more detail with the aid of an example shown in the diagrams. These show:

FIG. 1 A general view of the grabbing device in section,

FIG. 2 Detail of the latching device with guide teeth,

FIG. 3 Construction as FIG. 2, but in the latching position,

FIG. 4 Another form of the latching device with rolling bands.

In the various diagrams, corresponding parts are denoted by the same reference numbers. For the sake of simplicity, all constructional details, such as bearings, bolts, etc., not immediately essential to an understanding of the invention have been omitted from the diagrams.

The broken line in FIG. 1 indicates the outline of the fuel element 1 which has in it a hole 2 into which the grab plug 3 is introduced. The grab plug consists of a carrier tube 4 which is attached by flange 5 to pivotally mounted arm 6. Arm 6 is in turn attached to carrier arm 7 by means of connecting bush 29 in such a way that it can rotate about a pivot axis established by the bush. Carrier tube 4 is provided with a stop 8 which bears on the top surface 41 of fuel element 1 when the latching device is operated. At the same time, the stop 8 serves to ensure that grab plug 3 does not travel too far into fuel element 1. An internal sleeve 9 is rigidly fixed to carrier tube 4 and accommodates the latching device itself. Grab plug 3 terminates in nose 10 which is shaped in such a way as to facilitate entry into hole 2.

Internal sleeve 9 is composed of the portion 9' rigidly fixed to the carrier tube, sheath 25 and endplate 24. Within sleeve 9 are two voids separated by the sleeve base 9". A bellows 19 is attached to sleeve base 9" by means of a sealing connection. A plunger 14 passes through a hole in sleeve base 9", and bellows 19 is attached to the plunger head 20, again by means of a vapour-tight connection, thus forming a plunger pressure space 26 and a sleeve cylinder 34 which is continuously at the same pressure level as the interior of bellows 27.

The lower portion 9' of internal sleeve 9 is provided with openings 13 which contain the latches 11 and rockers 12. Openings 13, latches 11, rockers 12 and also valve cap 15 attached to plunger 14 are each provided with rolling surfaces 43. The rolling movement of the parts against one another requires a means of guidance. This is provided by teeth 44, not shown in FIG. 1.

The latches 11, shown in the extended position, engage the extraction recesses 40 of fuel element 1. The contact faces of latches 11 are somewhat rounded in order to make allowance for and irregularities. Plunger 14 can be provided with similar means of compensation to ensure intimate contact between latches 11 and all extraction recesses.

Plunger 14 is provided with an equalizing port 18 which connects plunger pressure space 26 with sleeve cylinder 34, but which can be closed by means of ball valve 16 located in valve cap 15 and loaded by spring 17.

The plunger head 20 is fitted with a pin 21 which operates a valve 22 in endplate 24, the disc of this valve being loaded by a spring 23. Into plunger pressure space 26 there passes a control pressure tube 31 which is movable and leads from the cooling-gas tube 30 inside the space in the pivotably movable arm 6 into the interior 28 of the carrier tube and ends in a port 46 in endplate 24.

The required positive or negative pressure required to actuate plunger 14 upward or downward to cause the latching device to respectively engage, or to be disengaged from the extraction recess 40 provided in the fuel element is supplied by way of this control pressure tube to plunger pressure space 26. Cooling gas is fed through cooling-gas inlet 30, the hollow swingable arm 6 and the interior 28 of the carrier tube into the annular space 32, from where it flows into sleeve cylinder 34 via ports 33 and can leave through openings 13 and nose vents 35.

Hollow swingable arm 6 contains a signal transducer 36 which is joined by way of electrical connections 37 to an indicator showing the position of grab plug 3. Signal transducer 36 is connected to measuring lead 38. Measuring tube 39, through which cooling gas continuously flows, is fitted with a measuring orifice 38′, and a nozzle 39′ is located at the outlet in nose 10. Measuring orifice 38′ measures the pressure differential caused by the flow resistance presented by outlet nozzle 39′. The values are passed to the signal transducer.

The manner of operation can be described with reference to FIG. 1. Plunger 14 is moved to its extreme positions by positive or negative pressure, respectively. In particular, the plunger is raised when a negative pressure is created in plunger pressure space 26 by way of tube 31. Bellows 19 then expands and plunger head 20 moves towards endplate 24. The negative pressure causes valve 22 to open until it is closed again by pin 21. Ball valve 16, connected to plunger pressure space 26 via equalizing port 18, closes immediately in response to the negative pressure. The negative pressure therefore has to be maintained by continuous extraction through duct 31.

When valve 22 closes, the pressure rises and the gas flow ceases. The two effects are utilized as control signals for the corresponding positions of the latches.

The upward movement of plunger 14 causes latches 11, guided by the teeth 44, to swing out to engage in the recess 40 in fuel element 1 thus to interconnect the fuel element 1 with grab plug 3.

When plunger 14 is caused to descend by application of positive pressure through tube 31 into the space 26 above plunger 14, the pressure in pressure space 26 is higher than the normal cooling-gas pressure, and the bellows is compressed against its own spring force. At the same time as the pressure rises, valve 22 in endplate 24 closes and ball valve 16 is opened by the higher pressure against the resistance of spring 17. Valve 16 remains open until it is closed by the action of the valve stem bearing against the nose 10. During this time the gas supply and also the rise of pressure through tube 31 must be maintained.

When valves 16 and 22 are closed, a rise in pressure is registered by the indicator on the charging machine, and both attainment of the maximum pressure and cessation of the gas flow are utilized as a signal that the latches are in the limit position in that they are then fully retracted into grab plug 3.

Operation of the rolling surfaces 43 on the latches 11 is illustrated in FIG. 2 because the scale of FIG. 1 is too small to show the mechanism clearly.

FIG. 2 shows the lower part of plunger 14 with equalizing port 18 shaped to form the valve seat, valve 16 being located in valve housing 15 and subjected to the tension of a spring 17. The periphery 43a of valve housing 15 is provided with teeth 44a which engage with the lever arm 11′ of latch 11, which has corresponding teeth 44b on the middle rolling surface 43b.

The opening 13 of internal sleeve 9 has rolling surfaces 43c with teeth 44c which engage in opposing teeth 44d′ and 44d″, the former being allocated to the rolling circle 43d′ of latch 11 and the latter to the rolling circle 43d″ of rocker 12. To ensure accurate guidance, further intermeshing teeth 44e and 44f are required between rocker 12 and latch 11. These teeth move back and forth on the common rolling circles 43e and 43f.

FIG. 3 is a section corresponding to that of FIG. 2, with the exception that the latches are shown in the locked position.

Regarding the manner of operation it is to be noted that, when plunger 14 descends, ball valve 16 is opened by the positive pressure, in which case the force of spring 17 has to be overcome. This takes place until valve stem 16′ rests on nose 10 and equalizing port 18 closes. During the downward movement of plunger 14 the latches 11 are deflected, guidance being provided by teeth 44a to 44e. At the lowest position, e. g. with ball valve 16 closed, positive pressure is maintained in plunger pressure space 26.

The pressure is raised on the one hand to ensure continuous engagement of latches 11 against extraction recesses 40, while on the other hand the latching device requires remote monitoring. This is preferably achieved by means of a manometer which continuously monitors the pressure of the flow medium. The gas flow can be measured by a flowmeter located at the same position.

FIG. 4 shows another version of the latching device where the teeth are replaced in an effective manner by flexible bands 45. The bands 45 are in each case in two parts and stressed in tension in opposite directions, their fixed points being located on the appropriate rolling surfaces 43. The possibility of play between the rolling surfaces 43 is thus completely eliminated.

The operation of this version is the same as that of the version with teeth described earlier, but by virtue of bands 45 the device for latching fuel element 1 to the grab plug 3 can be made simpler.

To protect grab plug from the heat radiated by fuel element 1, the surface of the grab plug, and in particular the carrier tube 4, can be provided with an insulating layer. This possibility is particularly significant in the case of high-temperature reactors, in order to keep the stresses arising from the thermal loading within the strength limits of the material.

We claim:

1. A grabbing device for a charging machine for a gas-cooled nuclear reactor for extracting fuel elements from the reactor core in an upward direction and wherein each fuel element includes a longitudinally extending hole provided with an extraction recess, said grabbing device comprising a carrier tube insertable into said hole in said fuel element, said carrier tube including a longitudinally extending opening through the wall thereof which is brought into a position of registration with said extraction recess when said carrier tube is lowered into the hole in the fuel element, latching means positioned within said opening in the wall of said carrier tube, said latching means including rocker and latch members establishing a rolling pivotal surface engagement with each other and with the wall of said carrier tube at the opposite ends of the opening therein, said rolling surface engagement being guided by flexible bands secured along the engaging surfaces, a plunger supported within said carrier tube for movement longitudinally of the tube, a lever arm extending from one of said members of said latching means, the end of said lever arm establishing a rolling pivotal surface engagement with said longitudinally movable plunger and which is likewise guided by flexible bands secured along the engaging surfaces, and means for actuating said plunger, movement of said plunger in one direction serving to effect actuation of said latching means in one direction to move said latch member into engagement with said extraction recess in the fuel element thus coupling said carrier tube with the fuel element, while movement of said plunger in the opposite direction serves to remove said latch member from said extraction recess.

2. A grabbing device for a charging machine for a gas-cooled nuclear reactor as defined in claim 1 wherein said carrier tube includes a cylinder formed therein and said plunger is constituted as a piston operating within said cylinder upon introduction of pressurized gas thereto.

3. A grabbing device for a charging machine for a gas-cooled nuclear reactor as defined in claim 1 wherein means are provided for passing a cooling gas through said carrier tube into the opening in the wall thereof for cooling said latching means and also through the lower end of said carrier tube.

* * * * *